Patented July 22, 1930

1,771,384

UNITED STATES PATENT OFFICE

CHARLES J. STROSACKER AND JAMES I. JONES, OF MIDLAND, MICHIGAN, ASSIGNORS TO THE DOW CHEMICAL COMPANY, OF MIDLAND, MICHIGAN, A CORPORATION OF MICHIGAN

METHOD OF RECOVERING CARBON BISULPHIDE

No Drawing. Original application filed January 25, 1926, Serial No. 83,711. Divided and this application filed December 7, 1926. Serial No. 153,208.

The method largely employed for the manufacture of carbon bisulphide consists in passing the vapor of sulphur over red hot charcoal or coke. Such sulphur vapor combines directly with the red hot carbon to form the carbon bisulphide together with various impurities, the principal one of which is hydrogen sulphide. This hydrogen sulphide passing through the condensers, which are employed to condense the carbon bisulphide, carries with it considerable carbon bisulphide, the amount depending upon the temperature. Cooling alone is not adequate to effect a separation, and there is accordingly a corresponding loss of carbon bisulphide so carried away. It is among the objects of the present invention to recover this carbon bisulphide by bringing the hydrogen sulphide and the carbon bisulphide vapor into contact with a suitable reagent whereby the hydrogen sulphide is absorbed, but the carbon bisulphide is unacted upon, and can then be condensed.

To the accomplishment of the foregoing and related ends, the invention, then, consists of the steps hereinafter fully described, and particularly pointed out in the claims, the following description setting forth but one of the various ways in which the principle of the invention may be employed.

In proceeding in accordance with our invention the mixture of hydrogen sulphide and carbon bisulphide is brought into contact with sodium sulphide, preferably in aqueous solution. The strength of such solution may vary, but preferably may be about 20° Bé. The contacting of the hydrogen sulphide with the sodium sulphide, where the latter is employed in aqueous solution, may be carried out in a scrubber tower or the like, or preferably by bubbling the gas through the solution in a tank.

The hydrogen sulphide reacts with the sodium sulphide, as indicated by the equation—

$$Na_2S + H_2S = 2NaHS$$

After the hydrogen sulphide has been thus absorbed the residual carbon bisulphide vapor may be readily condensed in any usual or preferred form of condenser. In some cases, however, it is desirable to maintain the solution sufficiently cool so that the carbon bisulphide no longer remains volatilized, but condenses at the same time that the hydrogen sulphide is absorbed. The carbon bisulphide in such event may then be separated by distillation, or if preferred, it can be drawn off as a layer, such decantation being readily feasible.

It will be understood of course that the present improved method of recovering carbon bisulphide is not necessarily limited to the case where this compound is made by the particular method before mentioned as the one generally employed for the production of such compound, but this method is applicable generally where gaseous products from the manufacture of carbon bisulphate including hydrogen sulphide are present and a separation is desired.

Instead of passing the exit gases, from the condenser, into a water solution of sodium sulphide, they may be passed through a body of water, and the sodium sulphide may be subsequently added. The water, if sufficient in amount, will absorb the hydrogen sulphide but has substantially no such effect on carbon bisulphide, and on the addition then of the sodium sulphide to the water will allow fixation of the gas.

The acid sodium sulphide resulting from the absorption may then be further treated with caustic soda, as in accordance with the reaction—

$$NaHS + NaOH = Na_2S + H_2O$$

The normal sulphide so resulting may then again be used for further absorption.

The method herein described and claimed is a division of our copending application Serial No. 83,711, filed January 25, 1926.

Other modes of applying the principle of our invention may be employed instead of the one explained, change being made as regards the details disclosed, provided the step or steps stated by any of the following claims, or the equivalent of such stated step or steps be employed.

We therefore particularly point out and distinctly claim as our invention:—

1. A process of making carbon bisulphide and an alkali metal hydrosulphide which comprises passing the vapor of sulphur in contact with carbon at a red heat, condensing the major portion of carbon bisulphide from the reaction products, subjecting the residual non-condensible gaseous mixture of carbon bisulphide and hydrogen sulphide to the action of an aqueous alkali metal sulphide solution to absorb such hydrogen sulphide, and condensing such residual carbon bisulphide.

2. A process of making carbon bisulphide and sodium hydrosulphide which comprises passing the vapor of sulphur in contact with carbon at a red heat, condensing the major portion of carbon bisulphide from the reaction products, subjecting the residual non-condensible gaseous mixture of carbon bisulphide and hydrogen sulphide to the action of an aqueous sodium sulphide solution to absorb such hydrogen sulphide, and condensing such residual carbon bisulphide.

Signed by us this 2nd day of December, 1926.

CHARLES J. STROSACKER.
JAMES I. JONES.